(12) United States Patent
Son et al.

(10) Patent No.: US 9,978,468 B2
(45) Date of Patent: May 22, 2018

(54) LIFTING SHACKLE OF HEAD ASSEMBLY FOR NUCLEAR REACTOR

(71) Applicant: DOOSAN HEAVY INDUSTRIES & CONSTRUCTION CO., LTD., Changwon-si (KR)

(72) Inventors: Jung Dae Son, Gimhae-si (KR); Sung Hwan Kim, Changwon-si (KR); Yong Kyu Kim, Masan-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 994 days.

(21) Appl. No.: 14/365,185

(22) PCT Filed: Dec. 11, 2012

(86) PCT No.: PCT/KR2012/010728
§ 371 (c)(1),
(2) Date: Jun. 13, 2014

(87) PCT Pub. No.: WO2013/089406
PCT Pub. Date: Jun. 20, 2013

(65) Prior Publication Data
US 2014/0314195 A1 Oct. 23, 2014

(30) Foreign Application Priority Data
Dec. 16, 2011 (KR) .......................... 10-2011-0136675
Dec. 10, 2012 (KR) .......................... 10-2012-0142621

(51) Int. Cl.
*B66B 19/00* (2006.01)
*G21C 19/10* (2006.01)
(Continued)

(52) U.S. Cl.
CPC ................ *G21C 19/10* (2013.01); *B66C 1/10* (2013.01); *B66C 1/66* (2013.01); *F16G 15/06* (2013.01)

(58) Field of Classification Search
CPC .. G21C 19/10; B66C 1/10; B66C 1/66; F16G 15/06; F16G 15/04; F16G 15/00; F16G 15/02
(Continued)

(56) References Cited

U.S. PATENT DOCUMENTS 2,435,336 A * 2/1948 Belvel ..................... F16G 15/02
59/86
4,134,255 A * 1/1979 McBain ................. F16G 13/00
59/78
(Continued)

FOREIGN PATENT DOCUMENTS

FR 2735198 A1 * 12/1996 ............... B63H 9/10
GB 2 192 374 A 1/1988
(Continued)

OTHER PUBLICATIONS

Office Action dated Feb. 17, 2015, dated Chinese Patent Office, in counterpart Application No. 201280062192.8.
(Continued)

*Primary Examiner* — Gabriela M Puig
(74) *Attorney, Agent, or Firm* — Sughrue Mion, PLLC

(57) ABSTRACT

A lifting shackle of a head assembly for a nuclear reactor according to one embodiment of the present invention comprises: a first member and a second member which extend in parallel to each other in a predetermined thickness and length and respectively have an upper portion and a lower portion; a first connection member which connects the upper portion of the first member and the upper portion of the second member to each other and is coupled to a hook;
(Continued)

coupling sections which are respectively provided at the lower portions of the first member and the second members and has a hollow portion so as to be coupled to the head assembly for a nuclear reactor via pins; and stress reducing sections which are formed at the upper portions of the first member and the second member such that the stress reducing sections extend from the first connection member to the first member and the side end of the second member at a predetermined curvature and protrudes upwards so as to reduce bending stress that is applied to the first connection member.

7 Claims, 7 Drawing Sheets

(51) Int. Cl.
*B66C 1/10* (2006.01)
*B66C 1/66* (2006.01)
*F16G 15/06* (2006.01)

(58) Field of Classification Search
USPC .............................. 294/215, 82.1, 74; 59/86
See application file for complete search history.

(56) References Cited

U.S. PATENT DOCUMENTS

| | | |
|---|---|---|
| 2011/0175383 A1 | 7/2011 | Segura |
| 2011/0265442 A1* | 11/2011 | Segura ..................... B66C 1/10 |
| | | 59/86 |
| 2013/0067881 A1* | 3/2013 | Khrakovsky ........... F16G 15/06 |
| | | 59/86 |

FOREIGN PATENT DOCUMENTS

| | | | |
|---|---|---|---|
| JP | 7-21681 U | 4/1995 | |
| JP | 2000-205236 A * | 7/2000 | .............. F16B 45/04 |
| JP | 2010-173792 A | 8/2010 | |
| KR | 20-1998-0011649 U | 5/1998 | |
| KR | 100844439 B1 | 7/2008 | |

OTHER PUBLICATIONS

International Search Report for PCT/KR2012/010728 dated Mar. 26, 2013.
Search Report dated Jun. 16, 2015, issued by the European Patent Office in counterpart Application No. 12856681.7.

* cited by examiner

[Fig. 1]
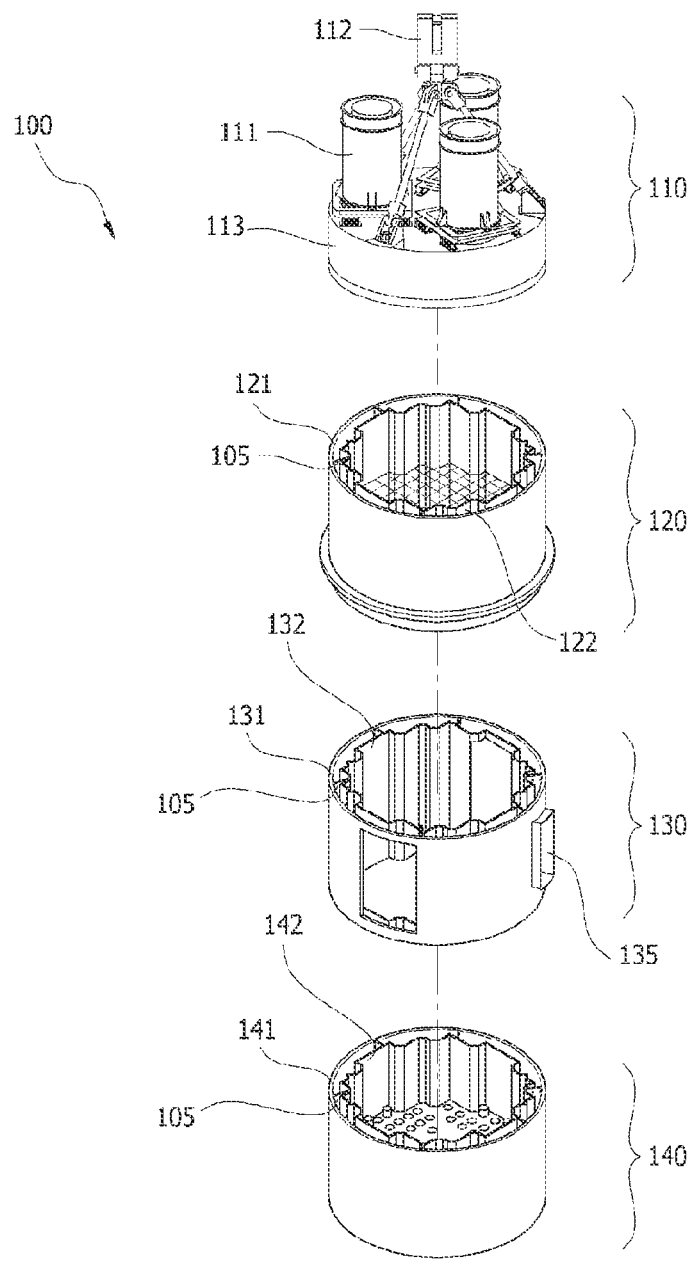

[Fig. 2]
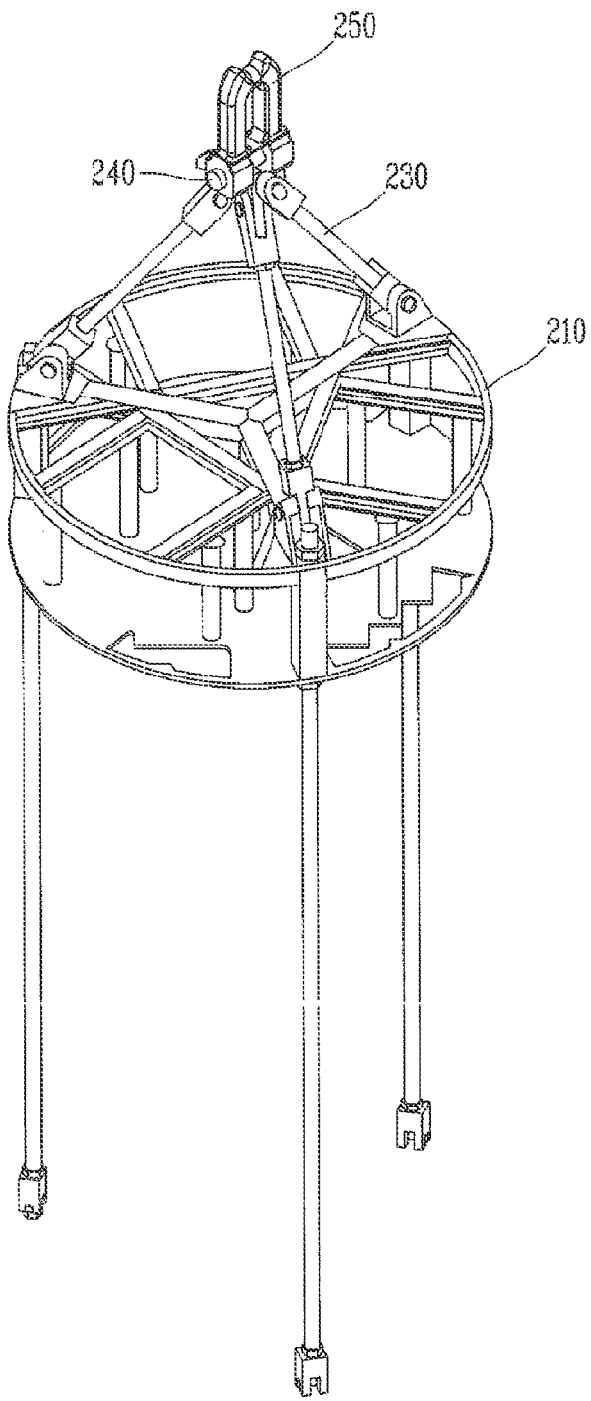

[Fig. 3]
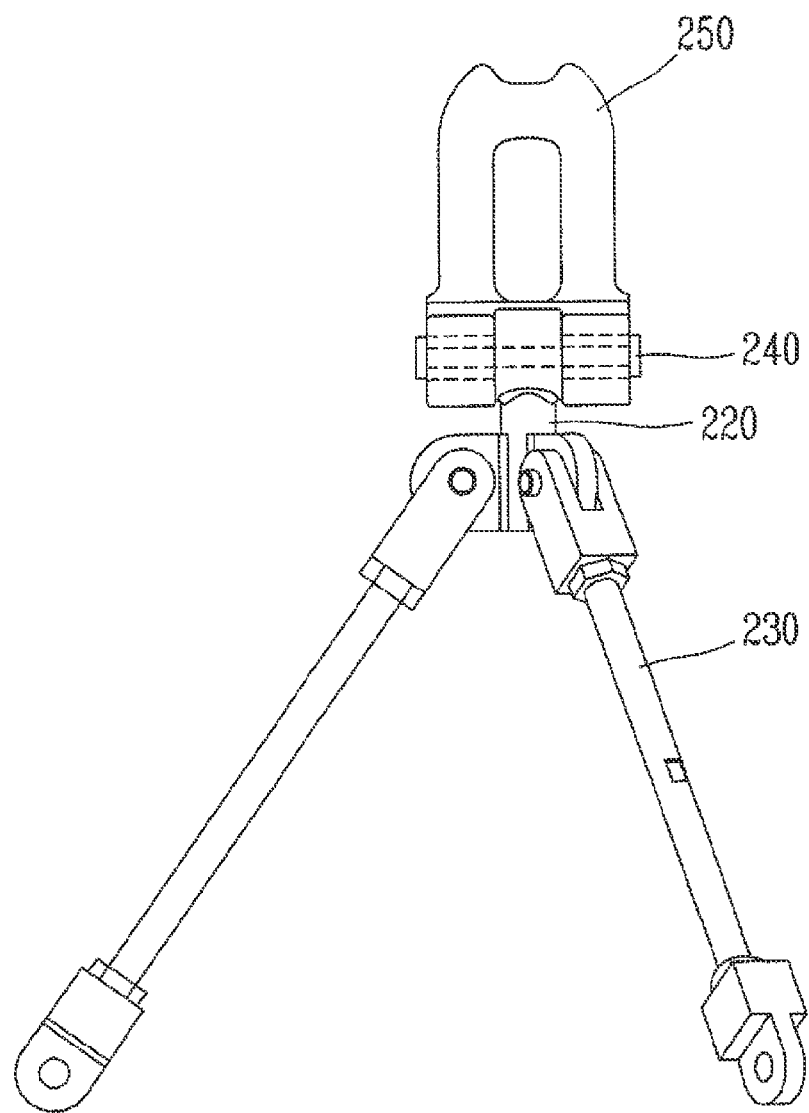

[Fig. 4a]
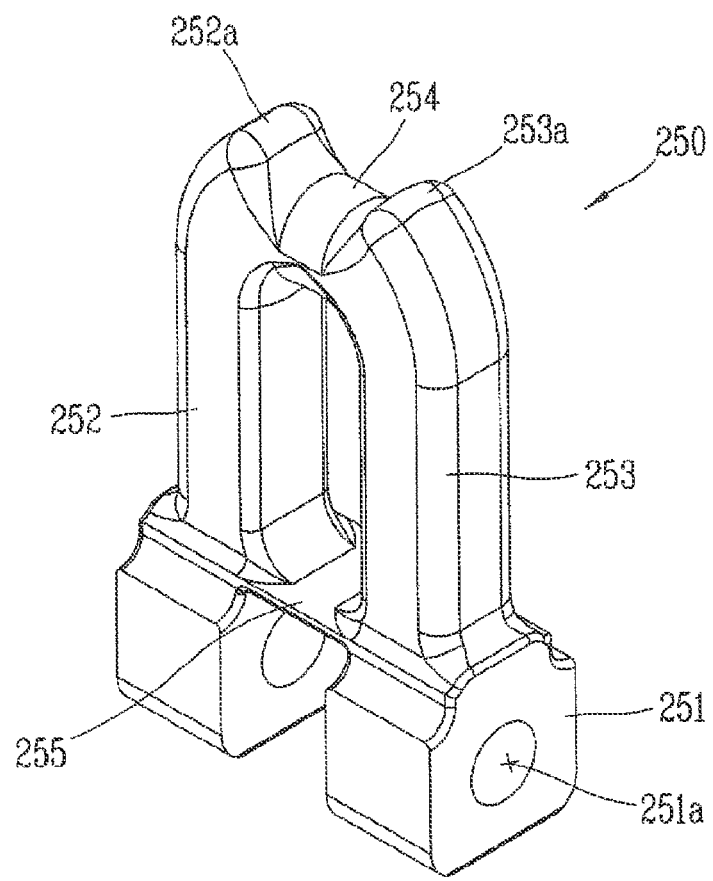

[Fig. 4b]
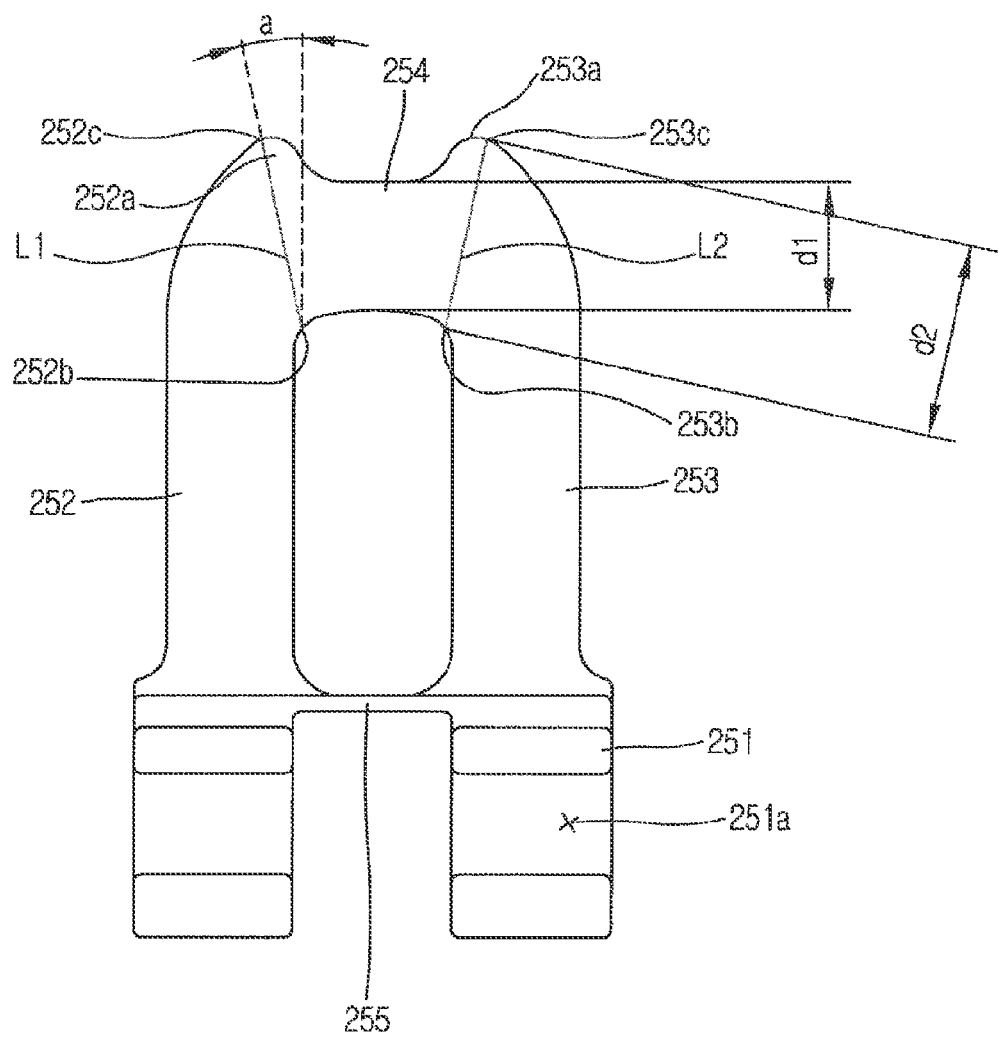

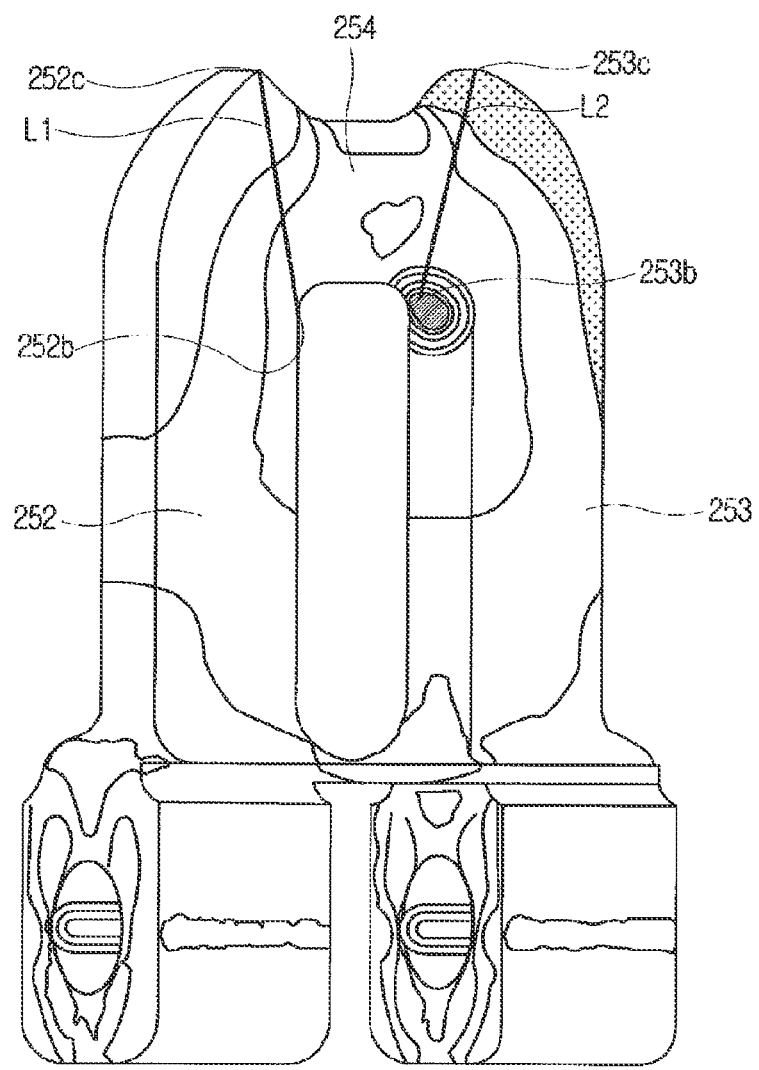
[Fig. 5a]

[Fig. 5b]
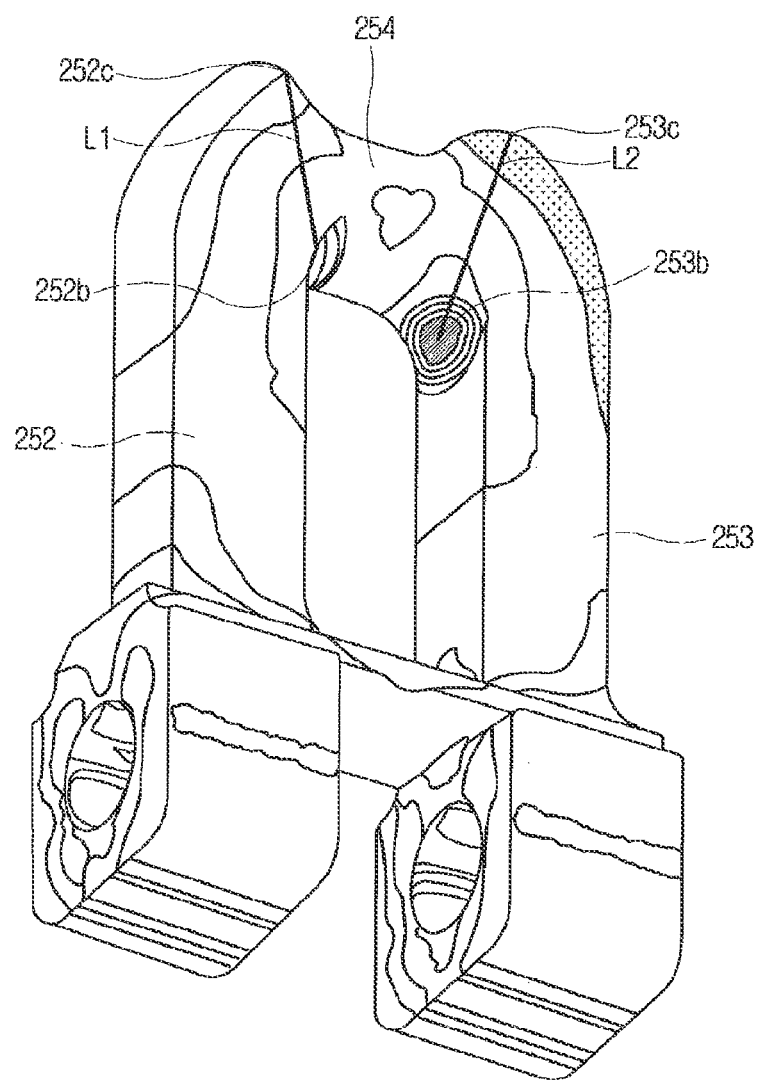

LIFTING SHACKLE OF HEAD ASSEMBLY FOR NUCLEAR REACTOR

TECHNICAL FIELD

The present invention relates to construction of a shackle that is connected to a hook in order to lift a head assembly for a nuclear reactor.

BACKGROUND ART

Generally, a nuclear reactor that is an apparatus that controls a nuclear chain fission reaction that immediately releases a huge amount of mass defect energy and converts some of thermal energy released in the fission process into usable energy. Generally, a head assembly is provided in an upper portion of a nuclear reactor head. A lifting apparatus is used when moving constituent members that are separated from the head assembly and re-installing the constituent members.

Nuclear fuels for the nuclear reactor are normally replaced every 18 months. Generally, during a nuclear fission material replacement, an integrated head assembly for the nuclear reactor lifts a nuclear reactor head, and the nuclear reactor head is moved to a temporal storage place.

In the related art, before doing such a job, a hydro set that absorbs impact is coupled to one end of a polar crane to prevent vertical vibration and a lifting frame-system shackle is used to be connected to and be separated from the other end of the hydro set, that is, a single hook.

However, unlike an integrated head assembly for OPR 1000, the nuclear reactor OPR 1000, an integrated head assembly for APR 1400, the nuclear reactor has to be decreased in weight, due to an increase in earthquake acceleration, and the nuclear reactor head is increased in weight. Therefore, a new shackle that can solve these problems is considered.

DISCLOSURE OF THE INVENTION

Therefore, an object of the present invention is to provide a lifting shackle that has more improved construction.

To achieve these and other advantages and in accordance with the purpose of the present invention, as embodied and broadly described herein, there is provided a lifting shackle for a head assembly for a nuclear reactor, which is connected to a hook to the head assembly, including: a first member and a second member that extend with a constant thickness and a constant length that extend in parallel to each other with a constant thickness and a constant length, each including an upper portion and a lower portion; a first connection member that couples an upper portion of the first member and an upper portion of the second member, and that is connected to the hook; connection units, each having a through hole in the center, into which a rod is inserted to couple the connection unit and the head assembly for the nuclear reactor, that are provided to lower portions of the first member and the second member, respectively; and stress reduction portions that are formed in the upper portions of the first member and the second member in such a manner as to extend at a constant curvature from the first connection member to side ends of the first member and the second member and to protrude upwards, respectively, to decrease bending stress that is applied to the first connection member.

In the lifting shackle, maximum-stress concentration portions may be formed in both ends of the first connection member, which come into contact with the first member and the second member, respectively, and a length of an imaginary connection line that connects an uppermost end of the stress reduction portion and the maximum-stress concentration portion may be greater than a thickness of the first connection member.

In the lifting shackle, the length of the imaginary connection line may be 1.15 to 1.6 times the thickness of the first connection member.

In the lifting shackle, the imaginary connection line may make a predetermined angle with respect to an imaginary line extending vertically from an inner surface of the first member.

In the lifting shackle, the predetermined angle may be in a range of 5 to 15 degrees.

In the lifting shackle, the connection unit may be coupled to a tripod assemble that includes three legs, a length of each being adjustable, and one end of the tripod assembly may be coupled to the head assembly for the nuclear reactor.

The lifting shackle may further include a second member that couples lower portions of the first member and the second member.

In a lifting shackle for a head assembly for a nuclear reactor, described above, according to at least one embodiment of the present invention, stress that concentrates on a specific portion can be decreased because members make up the shackle in such a manner that the members has a maximum curvature.

In addition, bending stress that is applied to a connection member is minimized, and thus the shackle according to the present invention is small in weight and is excellent in terms of lifting ability, compared to the existing shackle.

BRIEF DESCRIPTION OF THE DRAWINGS

FIG. 1 is a perspective exploded diagram illustrating an outlined configuration of an integrated head assembly for a nuclear reactor according to one embodiment of the present invention;

FIG. 2 is a diagram illustrating a relationship among a support frame of an air plenum according to one embodiment of the present invention, a tripod assembly, and a lifting shackle;

FIG. 3 is a diagram of the tripod assembly according to the embodiment of the present invention;

FIGS. 4A and 4B are perspective and cross-sectional diagrams of the shackle according to one embodiment of the present invention, respectively; and FIGS. 5A and 5B are diagrams illustrating that the lifting shackle illustrated in FIGS. 4A and 4B is in a state of stress concentration.

MODES FOR CARRYING OUT THE PREFERRED EMBODIMENTS

Reference will now be made in detail to the preferred embodiments of the present invention, examples of which are illustrated in the accompanying drawings.

A lifting shackle for a head assembly for a nuclear reactor according to the present invention is described in detail below referring to the drawings. Terms "module" and "unit" are used hereinafter interchangeably or individually only for easily describing constituent elements, and therefore are not intended to take on different meanings. In the present specification, if constituent elements according to different embodiments are the same, they are given the same reference numerals and a description of a constituent element that is used first in one embodiment substitutes for that of the constituent element that is used again in the other embodiments. In the present disclosure, although in in the singular number, a noun is construed as in the plural number, except as distinctively expressed in context.

Generally, a nuclear reactor is an apparatus that uses mass defect energy which is generated as a result of nuclear fission reaction. Unlike in a thermal furnace of a thermal power station, where combustion is automatically increasingly supported by combustion heat, the nuclear fission reaction occurs in the nuclear reactor, with neutrons produced in nuclear fission being used as a medium.

In the nuclear fission reaction in the nuclear reactor, nuclear fission is regulated by controlling the number of neutrons that are absorbed by nuclear fuels. In order to maintain nuclear fission in the nuclear reactor, among the neutrons that are produced in the nuclear fission, the number of the neutrons that are absorbed back by the nuclear fuels and cause other nuclear fission is 1 or greater. If the number of neutrons is 1, the nuclear fission reaction is uniformly maintained without being decreased and being increased. This state is called a critical state of the nuclear reactor. In addition, when the number is greater than 1, the number of nuclear fission reaction is gradually increased. This is called a super critical state, and a state as opposed to the super critical state is called a sub-critical state.

Generally, when the nuclear reactor operates to produce a constant power output, a method of keeping the nuclear reactor in the critical state or a method of keeping the nuclear reactor in a somewhat more critical state and then enabling a control rod to absorb redundant neutrons is used. The number of neutrons that are produced in one-time nuclear fission is 2 on average in a case of uranium-235, but they all do not contribute to the nuclear fission. The number of neutrons is decreased due to leakage to the outside, absorption into non-nuclear fission materials, or the like, and therefore, it is important to minimize loss of these neutrons in order to continuously operate the nuclear reactor. Methods for preventing the loss of the neutrons includes a method of increasing the probability of absorption by increasing an amount of the nuclear fuels or decreasing speeds of fast neutrons being produced in the nuclear fission to a thermal neutron level, a method of sufficiently a size of the nuclear reactor to minimize an amount of leakage to outside of a central core of the nuclear reaction, a method of minimizing the absorption into the non-nuclear nuclear fission materials, and the like. The neutrons that are produced at the moment of nuclear fission are fast neutrons with a high energy level, and thus a probability of being absorbed by the nuclear fuels is extremely low. Therefore, it is important to decrease the speeds of the fast neutrons and thus increase the probability of absorption. The control of the nuclear reactor is by adjusting the number of neutrons by inserting or removing the material with a large cross-section area that absorbs the neutrons, such as cadmium or boron, into and from the central core of the nuclear reactor. In addition, a method of changing an amount of reflectors or moderators may be used for the control of the nuclear reactor.

One embodiment of the present invention is described in detail below referring to the drawings.

Referring to FIG. 1, an integrated head assembly 100 for the nuclear reactor according to one embodiment of the present invention includes a fan module 110, an upper module 120, a central module 130, and a lower module 140.

Referring to FIG. 1, the fan module 110 is positioned in an upper portion of a nuclear reactor head, and a cooling fan 111, a lifting assembly 112, and an air plenum 113 are integrated into the fan module 110. The upper module 120 is coupled to a lower end portion of the air plenum 113. The cooling fan 111 is an apparatus that is installed to effectively perform cooling within the head assembly 100 for the nuclear reactor, and adjusts a flow of air that is described below. The lifting assembly 112 includes a tripod and a shackle. The tripod is for lifting the entire integrated head assembly 100. The shackle coupled to an upper end portion of the tripod is connected to a crane 300 for lifting the integrated head assembly 100. The air plenum 113 supports and is integrated with the cooling fan 111 and the lifting assembly 112. A ring-shaped beam is coupled to the lower end portion of the air plenum 113, and the upper module 120 is coupled to a lower end portion of the ring-shaped beam.

Referring to FIG. 1, an upper shroud plate 121 and an upper baffle 122 are provided within the upper module 120. The upper shroud plate 121 in the cylindrical shape has openings in the top and the bottom. The baffle 122 is held in place at predetermined distances from an inside surface of the shroud plate 121 in order to form an air passage. In like the upper module 120, a central shroud plate 131 and a central baffle 132 are provided in the central module 130, and a lower shroud plate 141 and a lower baffle 142 are provided in the lower module 140. However, it is preferable that an air inlet 135 should be provided in such a manner that the air inlet 135 pierces through both the central shroud plate 131 and the central baffle 132.

Referring to FIG. 1, the shroud plates 121, 131, and 141 are provided in such a manner that the shroud plates 121, 131, and 141 surround the baffle 122, 132, and 142, respectively, and thus function as covers for protecting for assemblies that are provided within the modules, respectively. It is preferable that the shroud plates 121, 131, and 141 and the baffles 122, 132, and 142 are fixed to the support column 105 that is provided in the upright position in such a manner that one end of the support column 105 is coupled to an upper end portion of the upper module 120 and the other end is coupled to a lower end portion of the lower module. The support column 105 is an assembly that vertically supports the head assembly 100 for the nuclear reactor, and is made of an H-beam that is suitable for carrying a bending load. A control rod drive mechanism and control rods are provided within the lower baffle 142.

Outside air, introduced by the cooling fan 111, flows through the air inlet 135 into a flow space between the baffles 122, 132, and 142 and the shroud plates 121, 131, and 141, respectively, thereby effectively cooling the control rod drive mechanism and the nuclear reactor head.

The head assembly 100 for the nuclear reactor lifts the control rod drive mechanism and the nuclear reactor head when replacing the nuclear fuels. The control rod drive mechanism that is installed within the lower module 140 is an apparatus that inserts and removes the control rod for adjusting a nuclear reaction speed of the central core of the nuclear reactor. The control rod drive mechanism has tubes in the shape of a honeycomb. The multiple control rods are inserted and removed into and from the tubes, respectively. The control rods are moved upwards and downwards, while being inserted into the control rod drive mechanism, in order to adjust the nuclear reaction speed of the central core of the nuclear reactor. A control rod position indication sensor for sensing a position of the control rod is provided in the control rod drive mechanism. A power source for driving the control rods is included in the control rod drive mechanism.

In most of the cases, a lot of jobs associated with the control rod drive mechanism are done in the head assembly 100 for the nuclear reactor. Such jobs include jobs of replacing, repairing and performing maintenance work on the power source for driving the control rods, jobs of replacing, repairing and performing maintenance work on the control rod position indication sensor, jobs of performing calibration when installing the control rod position indication sensor, and the like. In the related art, in order to do the jobs associated with the control rod drive mechanism, the cooling fan, the lifting assembly 112, and the air plenum 113 have to be sequentially removed and then are lifted. Then, a cable support unit is provided below has to be disassembled and be removed before the baffles 122, 132, and 142 and the shroud plates 121, 131, and 141 are separated, respectively. The jobs of individually removing the constituent apparatuses from the head assembly 100 for the nuclear reactor or disassembling the constituent apparatuses have the following problems. Firstly, it takes a lot of working hours and extensive labor to do the jobs, and this increases cost in an inefficient manner. Secondly, the jobs of removing the constituent apparatuses carry the risk of deforming or damaging the constituent apparatus. Thirdly, when the deformation or the damage occurs, this makes it difficult to reassemble the constituent apparatuses and return them to their respective original positions. To solve these problems, an integrated head assembly (IHA) for the nuclear reactor is used that is manufactured by integrating the fan module 110, the upper module 120, the central module 130, and the lower module 140.

FIG. 2 is a diagram illustrating a relationship among a support frame of an air plenum according to one embodiment of the present invention, a tripod assembly, and a lifting shackle. FIG. 3 is a diagram of the tripod assembly according to the embodiment of the present invention. FIGS. 4A and 4B are perspective and cross-sectional diagrams of the shackle according to one embodiment of the present invention, respectively. FIGS. 5A and 5B are diagrams illustrating that the lifting shackle illustrated in FIGS. 4A and 4B is in a state of stress concentration.

As illustrated in FIGS. 2 and 3, a support frame 210 is provided in such a manner that the support frame 210 supports a load of the air plenum 113. The tripod assembly has three legs 230, a connection body 220 provided on upper end portions of the three legs 230. Each leg extends from the connection body 220 to the support frame 210.

Each of the legs 230 is formed to include a nut 231 with which a length of the leg is adjusted in upward and downward directions. Turning of the nut 231 adjusts the length of the leg 230. Accordingly, at the time of the lifting, the support frame 210 is made to be parallel to the horizontal plane. Then, the leg 230 is provided in such a manner the leg 230 can rotate about the connection body 220.

The legs 230 that are coupled to the connection body 220 radially extend in such a manner that an angle between each of the legs 230 is 120 degrees.

The connection body 220 is coupled to the connection unit 251 with a rod 240. At this time, each of the connection body 220 and the connection unit 251 includes a hole 251a through which the rod 240 passes.

As illustrated in FIGS. 4A and 4B, a lifting shackle 250 includes a first member 252 and a second member 253 that extend in parallel to each other with a constant thickness and a constant length. Each of the first member 252 and the second member 253 includes an upper portion and a lower portion. At least one portion of a circumference of each of the first member 252 and the second member 253 is formed in such a manner as to have a constant curvature.

The lifting shackle 250 is formed in one piece using a casting method. Otherwise, the members that make up the lifting shackle are coupled to one another with a connection means. That is, the first member 252 and the second member 253 are prepared. Then, the upper portions of the first member 252 and the second member 253 are coupled to each other with a connection member, and the lower portions are coupled to each other with a connection member. At this time, the members may be coupled to one another using a welding method or with screws. However, it is preferable that the lifting shackle should be formed in one piece using the casting method in order to increase coupling strength between each of the members that make up the lifting shackle 250.

The upper portion of the first member 252 and the upper portion of the second member 253 are coupled to each other with a first connection member 254. The first connection member 254, with which couples the upper portion of the first member 252 and the upper portion of the second member 253 are coupled to each other, is connected to a hook of a polar crane. A contact portion of the first connection member 254, which is connected to the hook, is configured to be in the shape corresponding to the hook, in such a manner that an area of a contact surface that comes into contact with the hook is maximized.

Then, the connection units 251 are provided on the lower portions of the first member 252 and the second member 253m respectively. The rod 240 passes through the hole 251a in the connection unit 251 in order to connect the connection body 220 and the lifting shackle 250.

A connection member 255 is further provided that couples the first member 252 and the second member 253. The connection member 255 is provided away from the first connection member 254. The lower portion of the first member 252 and the lower portion of the second member 253 are coupled to each other with the second connection member 255. The connection member 255 prevents the lower portions of the first member 252 and the second member 253 from being moved toward each other due to the load of the air plenum 113 when lifting the control rod drive mechanism and the nuclear reactor head with the hook connected to the first connection member. That is, the connection member 255 supports the first member 252 and the second member 253 in such a manner as to prevent the lower portions of the first member 252 and the second member 253 from be deformed due to the external force.

That is, the first member 252, the second member 253, and the first connection member is in the shape of an inverted U that is suitable for connection to the hook. The second connection member 255, which extends in the transverse direction, prevents the lower portions of the first member 252 and the second member 253 from being moved inward or outward.

In addition, the second connection member is provided in such a manner as to couple the lower portions of the first member 252 and the second member 253, and thus may prevent the tripod assembly from moving between the first member and the second member.

Stress reduction portions 252a and 253a are formed in the upper portions of the first member 252 and the second member 253, respectively. The stress reduction portions 252a and 253a reduce bending stress (stress that occurs because a result of one side of the first connection member droops due to the load of the first member 252 or the second member 253 when the first connection member is pulled upwards). The stress reduction portions 252a and 253a extend at a constant curvature from the first connection member 254 to side ends of the members 252 and 253, respectively, and protrude upwards.

At this time, it is preferable that imaginary connection lines L1 and L2 that connect uppermost ends 252c and 253c of the stress reduction portions 252a and 253a to maximum-stress concentration portions 252b and 153b, respectively, should make an angle of 5 degrees to 15 degrees with respect to imaginary lines extending vertically from inner surfaces of the first member 252 and the second member 253, respectively. Out of the angel range (a) of 5 degrees to 15 degrees, positions of the maximum-stress concentration portions 252b and 153b are changed. In other words, the imaginary connection line is a line that connects the maximum-stress concentration portion (Max) and a minimum-stress concentration portion. Each of the uppermost ends 252c and 253c of the stress reduction portions 252a and 253a is any one of the minimum-stress concentration portions (Min).

In addition, it is desirable that lengths d2 of the imaginary connection lines L1 and L2 should be 1.15 to 1.6 times a thickness d1 of the first connection member. When the lengths d2 of the imaginary connection lines L1 and L2 are 1.15 are less than 1.16 times the thickness d1 of the first connection member, because a cross-sectional area of the lifting shackle that is proportional to the lengths d2 of the imaginary connection lines L1 and L2 is not sufficiently increased, the stress is not decreased as much as is desired. Then, when the lengths d2 of the imaginary connection lines L1 and L2 are 1.6 or more times the thickness d1 of the first connection member, this is not desirable because the positions of the maximum-stress concentration portions 252b and 253b are changed.

The lengths d2 of the imaginary connection lines L1 and L2, and the angle (a) between each of the imaginary connection lines L1 and L2 and the imaginary line extending vertically from each of the inner surfaces of the first member 252 and the second member 253 are obtained as a result of analyzing the stress that acts on the lifting shackle using a simulation technique. As illustrated in FIGS. 5A and 5B, the lengths of imaginary connection lines L1 and L2 are the length d1 or less within a predetermined angle range (a), a contact surface of the first connection member 254 and a contact surface of the first member 252 or the second member 253, which come into contact with each other, are increased and thus the stress is decreased to within satisfactory design range. That is, a critical load per unit weight of the lifting shackle is maximized within the design range for the lifting shackle, by minimizing a load per unit weight that is applied to the contact surface of the first connection member 254 and the contact surface of the first member 252 or the second member 253 that come into contact with each other.

In this manner, the stress reduction portions 252a and 253a that are formed on the first member 252 and the second member 253, respectively, maximize a statically indeterminate beam effect that results in reducing the stress applied to a specific area. That is, the ability of the lifting shackle to lift the assembly is increased while reducing the load of the lifting shackle itself, compared to the existing shackle, by minimizing the stress that is applied to the max stress concentration portion between the first connection member and the first member or the second member.

The configuration and the method relating to the lifting shackle for the head assembly for the nuclear reactor described above according to the embodiments are not applied in a limiting manner, but all of or some of the embodiments may be selectively combined with each other to create various modifications to the embodiments.

Embodiments of the present invention are applied to a lifting shackle for a head assembly for a nuclear reactor.

The configuration and the method of the embodiments according to the present invention, described above, are not applied in a limiting manner, but all of or some of the embodiments may be selectively combined with each other to create various modifications to the embodiments.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A lifting shackle for a head assembly for a nuclear reactor, which is connected to a hook to the head assembly, comprising:
   a first member and a second member that extend with a constant thickness and a constant length that extend in parallel to each other with a constant thickness and a constant length, each including an upper portion and a lower portion;
   a first connection member that couples the upper portion of the first member and the upper portion of the second member, and that is connected to the hook;
   connection units, each having a through hole in the center, into which a rod is inserted to couple the connection unit and the head assembly for the nuclear reactor, that are provided to the lower portions of the first member and the second member, respectively; and
   stress reduction portions that are formed in the upper portions of the first member and the second member in such a manner as to extend at a constant curvature from the first connection member to side ends of the first member and the second member and to protrude upwards, respectively, to decrease bending stress that is applied to the first connection member,
   wherein the first connection member is integrally formed with the upper portions of the first member and the second member so as to be fixed with respect to the upper portions of the first member and the second member.

2. The shackle of claim 1, wherein maximum-stress concentration portions are formed in both ends of the first connection member, which come into contact with the first member and the second member, respectively, and
   wherein a length of an imaginary connection line that connects an uppermost end of the stress reduction portion and the maximum-stress concentration portion is greater than a thickness of the first connection member.

3. The shackle of claim 2, wherein the length of the imaginary connection line is 1.15 to 1.6 times the thickness of the first connection member.

4. The shackle of claim 3, wherein the imaginary connection line makes a predetermined angle with respect to an imaginary line extending vertically from an inner surface of the first member.

5. The shackle of claim 4, wherein the predetermined angle is in a range of 5 to 15 degrees.

6. The shackle of claim 1, wherein the connection unit is coupled to a tripod assembly that includes three legs, a length of each being adjustable, and
   wherein one end of the tripod assembly is coupled to the head assembly for the nuclear reactor.

7. The shackle of claim 1, further comprising a second connection member that couples lower portions of the first member and the second member.

\* \* \* \* \*